Patented Jan. 4, 1938

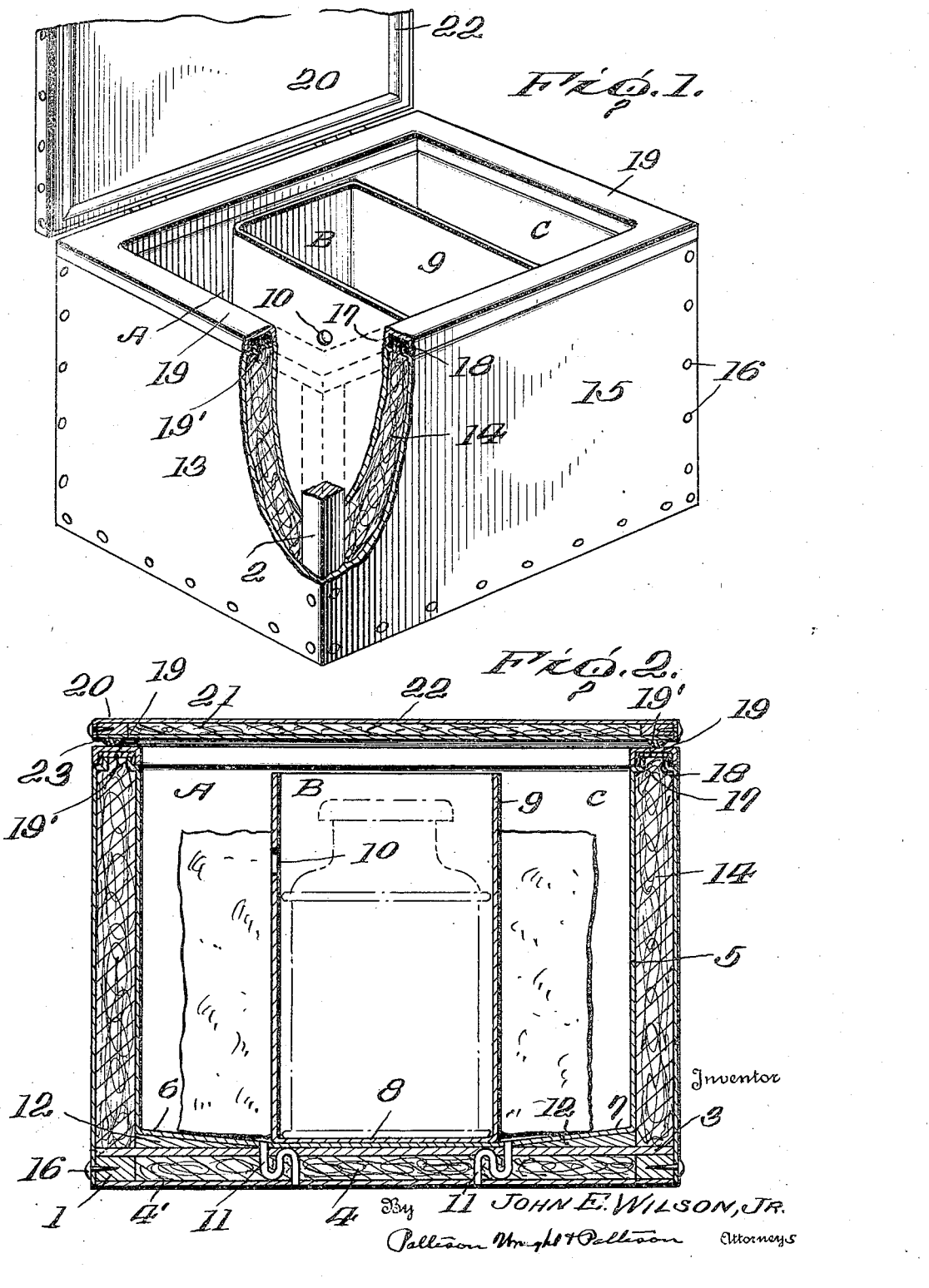

2,104,684

UNITED STATES PATENT OFFICE 2,104,684

SANITARY STEEL MILK COOLING CABINET

John E. Wilson, Jr., Smyrna, Del.

Application October 11, 1934, Serial No. 747,862
Renewed March 10, 1937

1 Claim. (Cl. 62—79)

This invention relates to certain new and useful improvements in a sanitary steel milk cooling cabinet, the object being to provide a cabinet which is efficient, economical, durable and one which can be manufactured very cheaply.

Another object of my invention is to provide a milk cooling cabinet especially adapted to be used by the milk producer who cannot obtain a daily ice delivery; whereby the milk producer can store a quantity of ice, at least 400 lbs., usually a week's supply; whereby the farmer can obtain a much lower price per hundred pounds by purchasing the ice in large quantities; whereby the cost of delivery to the milk producer is greatly reduced by requiring only one or two deliveries per week instead of the costly daily deliveries; whereby the storage of ice will maintain the milk at the proper temperature cheaply until it can be delivered, without danger of spoiling or becoming harmed by the growth of bacteria.

Another object of my invention is to provide a cabinet with a central water compartment on each side of which is arranged an ice compartment having an inclined bottom for maintaining the cakes of ice in said compartment against the side wall of the water compartment, and in a dry condition, whereby I am able to maintain the water in the water compartment at a temperature of from 7 to 10 degrees F. lower by having the surface of the ice come in direct contact with the walls of the center water container than it is possible with other types of cabinets in which the ice is disposed in an ice compartment and is not kept in a dry condition and maintained in close contact with the walls of the water compartment.

A still further object of my invention is to provide a cabinet which is thoroughly insulated and one in which the ice compartments are provided with drains having traps, so that a cabinet is produced, which has a greater efficiency than other types of cabinets, as the same amount of ice maintains the water in the central compartment cooler for a greater length of time, whereby the cans of milk placed in the water compartment can be kept at the proper temperature very cheaply.

Other and further objects and advantages of the invention will be hereinafter set forth and the novel features thereof defined by the appended claim.

In the drawing,

Figure 1 is a perspective view of a milk cooling cabinet constructed in accordance with my invention, a portion being broken away, and Figure 2 is a vertical, longitudinal section of the same showing a milk can in position in dotted lines, and the cover closed.

In constructing a cabinet in accordance with my invention, I employ a rectangular frame 1 formed of wood, on the corners of which are disposed vertical standards 2, forming corner posts in order to form a rigid structure which will be strong and durable, for the inner and outer shells of the cabinets as hereinafter described. Disposed on the frame 1 is a floor 3, preferably formed of a ply-board and secured in position in any desired manner under which is arranged a slab of insulating material 4 of the dry-zero type of insulation, said slab being preferably enclosed by a bottom of sheet metal 4', as clearly shown.

Disposed on the floor board 3 between the corner portion 2 is a rectangular container 5 formed of galvanized sheet metal and is herein shown provided with inclined bottom portions 6 and 7, at its ends terminating in a central horizontal portion 8, on which is seated a central container 9, formed of galvanized sheet metal, said central container when in position within the container 5, forms three compartments A, B and C, in the main container 5. The compartments A and C form ice compartments and the compartment B forms a water compartment.

While in the drawing I have shown and described in the specification, a cabinet formed with three compartments, by positioning a central container within the main container, I wish it to be clearly understood that these three compartments can be formed by placing partitions within the main compartment 5, and therefore I do not wish to limit myself to any particular manner of forming the various compartments in the cabinet, as I am aware that they can be formed in various ways without departing from the spirit of my invention.

The water compartment B is adapted to contain water in which cans of milk are placed so as to maintain the milk at the proper temperature, and this compartment is provided with an overflow 10 into one of the ice compartments and each ice compartment is provided with a drain outlet provided with a trap so that the water melting from the ice in the ice compartments will drain out of the cabinet without allowing any air to enter the cabinet, whereby the ice will remain in a dry condition.

Suitable filler blocks 12 are disposed on the floor 3 under the inclined bottom portions 6 and 7 of the container 5 forming a support for the ice compartments and while in the drawing I have shown the ice compartments provided with integral inclined bottoms, it is, of course, understood that I do not wish to limit myself to the particular manner of forming inclined bottoms, as I am aware that false inclined bottoms could be inserted in the ice containers in order to produce a dry ice compartment of such a construction that the cakes of ice would be held by gravity in contact with the side walls of the water compartments without departing from the spirit of my invention.

Slabs 13 and 14 of insulated material of the dry-zero type are disposed between the corner post 2 against the outer surface of the container 5 and these slabs are enclosed by an outer shell of galvanized sheet metal 15, which is preferably formed of plates secured to the corner post by fastening member 16, such as screws or nails, although I wish it to be clearly understood that this is not essential as other fastening means could be employed without departing from the spirit of my invention.

The galvanized sheet metal shell 15 is secured to the plate 4' and forms an outer casing for the complete cabinet, so as to completely enclose the insulating material and protect it from moisture.

The upper edge of the inner container 5 is bent outwardly as shown at 17, and the upper edge of the outer shell 15 is bent inwardly as shown at 18 and over these edges is secured by any suitable means, such as welding or soldering, a rectangular frame 19, which is substantially inverted U-shaped in cross section and is preferably formed of a heavy galvanized channel iron, under which is placed insulating material 19', such as heavy water proof paper or rubber gasket to break the conductivity of heat between the inside metal lining, 5, and the outside metal lining, 15, thereby reducing the heat losses, and completely sealing the insulation material between the inner and outer shells, and forms the top edge of the cabinet, in order to protect the top edge, and to prevent its being damaged by the milk cans as they are inserted and removed from the cabinet.

The cabinet is provided with a hinge cover 20 formed of a rectangular frame in which is arranged a slab 21 of insulating material of the dry-zero type, and the slab is enclosed in a casing 22 formed of sheet metal so as to protect the insulating material from moisture, and provide a rigid cover. The cover is provided with a strip of packing 23, which engages the frame 19, so as to form an air-tight joint between the cabinet and cover, when the cover is closed, and while I have shown one form of packing, of course, it is understood that various forms of packing could be used without departing from the spirit of my invention.

The particular manner of producing a cabinet in accordance with my invention is disclosed in a companion application which will be filed at a later date, as this invention relates particularly to a form with three compartments, namely a central water compartment and two ice compartments so constructed that the cabinet is provided with an ice compartment at each end having a large capacity and of such a construction that the cakes of ice disposed therein will slide down the inclined bottoms by gravity, so as to be maintained in close contact with the side walls of the water compartment at all times, and being in a dry condition so as to maintain the water in the water compartment at a temperature 7 to 10 degrees F. lower than is possible with other types of cabinets, which are not provided with means for holding the ice while melting in contact with the walls of the water compartment.

While in the drawing I have shown certain details of construction, I wish it to be clearly understood that I do not wish to limit myself to any particular manner of constructing the cabinet, as my invention consists of producing a milk cooling cabinet of the type with a central water compartment on each side of which is arranged an ice compartment so constructed that the ice is maintained in a dry condition and in contact with the walls of the water compartment by gravity, whereby I am able to increase the efficiency of the cabinet.

What I claim is:

As a new article of manufacture, a milk cooling cabinet comprising an oblong shaped outer container having bottom portions at each end inclined downwardly towards the center and terminating at a central flat portion, an oblong shaped inner container arranged transversely within the outer container on said flat portion, the arrangement forming a water compartment with an ice compartment at each end thereof, the bottom of said inner container having an area equal to the area of the centrally disposed flat portion and said container being constructed to provide vertical walls against which the ice is adapted to be maintained by gravity sliding on the inclined end portions, said water compartment being provided with an overflow adjacent its upper end extending laterally through one wall thereof and communicating with one of the end compartments, a drain for each of said ice compartments provided with a trap and a cover for closing the outer compartment.

JOHN E. WILSON, Jr.